(12) United States Patent
Carlson

(10) Patent No.: US 10,021,886 B2
(45) Date of Patent: Jul. 17, 2018

(54) METHOD AND APPARATUS FOR DESHELLING SHELLFISH

(71) Applicant: Eric Carlson, Scarborough, ME (US)

(72) Inventor: Eric Carlson, Scarborough, ME (US)

( * ) Notice: Subject to any disclaimer, the term of this patent is extended or adjusted under 35 U.S.C. 154(b) by 338 days.

(21) Appl. No.: 14/917,038

(22) PCT Filed: Oct. 22, 2015

(86) PCT No.: PCT/US2015/056798
§ 371 (c)(1),
(2) Date: Mar. 7, 2016

(87) PCT Pub. No.: WO2016/081139
PCT Pub. Date: May 26, 2016

(65) Prior Publication Data
US 2016/0295873 A1    Oct. 13, 2016

Related U.S. Application Data

(60) Provisional application No. 62/082,247, filed on Nov. 20, 2014.

(51) Int. Cl.
*A22C 29/00* (2006.01)
*A22C 29/02* (2006.01)
*B65G 17/46* (2006.01)

(52) U.S. Cl.
CPC .......... *A22C 29/024* (2013.01); *A22C 29/021* (2013.01); *A22C 29/023* (2013.01); *A22C 29/025* (2013.01); *B65G 17/46* (2013.01)

(58) Field of Classification Search
CPC .................. A22C 29/00; A22C 29/005; A22C 29/02–29/028
USPC ................................................... 452/1, 8–12
See application file for complete search history.

(56) References Cited

U.S. PATENT DOCUMENTS

| | | |
|---|---|---|
| 6,042,465 A | 3/2000 | Larson et al. |
| 2012/0034358 A1 | 2/2012 | Almeida et al. |
| 2014/0248826 A1 | 9/2014 | Zhou |

*Primary Examiner* — Richard T Price, Jr.
(74) *Attorney, Agent, or Firm* — Jeffrey Joyce; Patricia Mathers

(57) ABSTRACT

A method and apparatus for deshelling shellfish, particularly lobsters. An automated processing line conveys shellfish through a plurality of stations that sanitize, butcher, cut, and extract the meat, and then packages and prepares the package for sale. Vision systems with multi-axis robots guide and manipulate the shellfish through the processing line. Customized breaking blocks are used to sever parts of the shellfish, for example, the tail, knuckles and claws of a lobster, and a customized gripping device is provided for securing the severed parts in position on a conveyor. A water knife is then used to precisely cut the shell of the severed part.

15 Claims, 14 Drawing Sheets

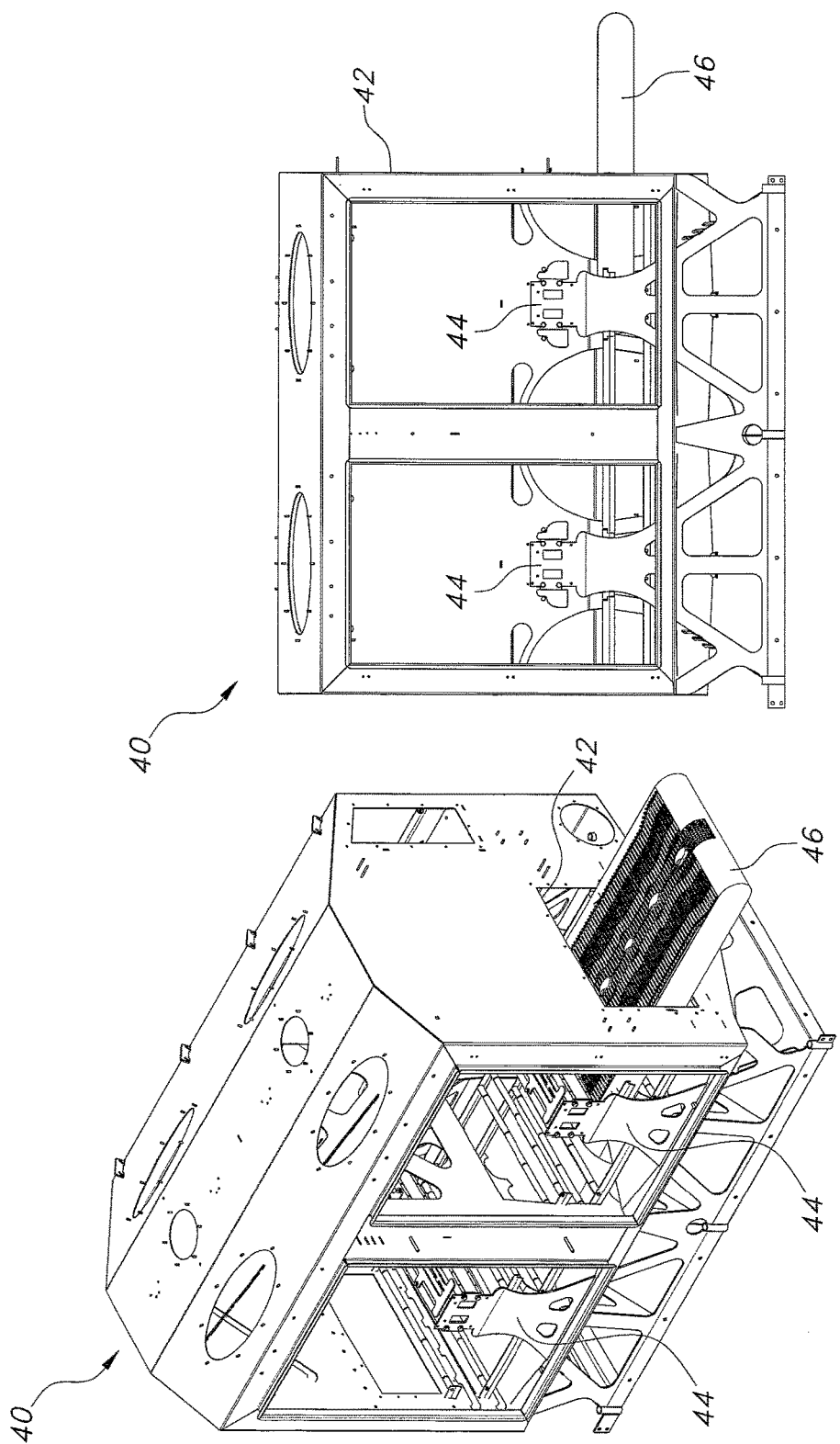

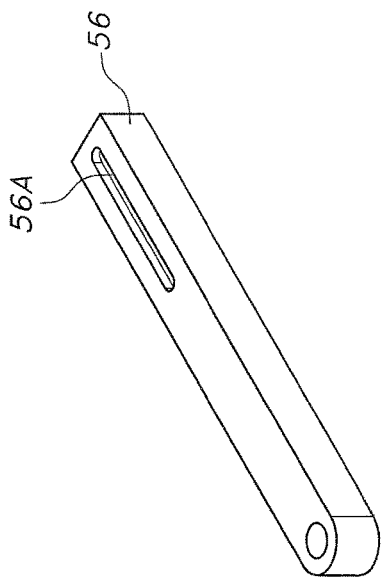
FIG. 17
FIG. 18
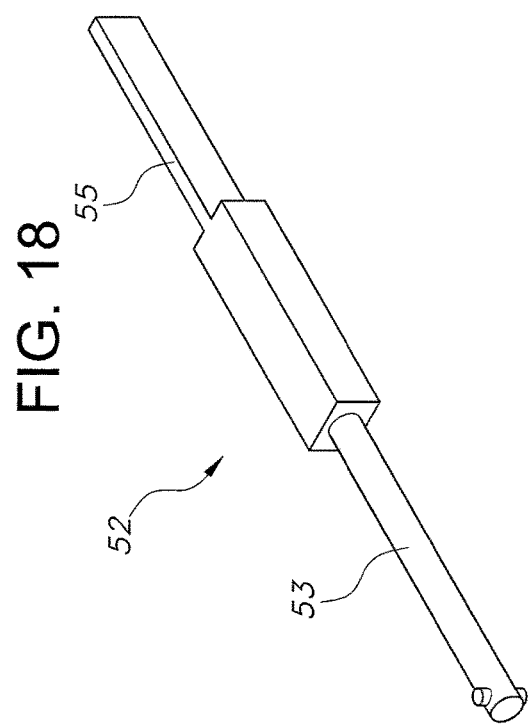
FIG. 20
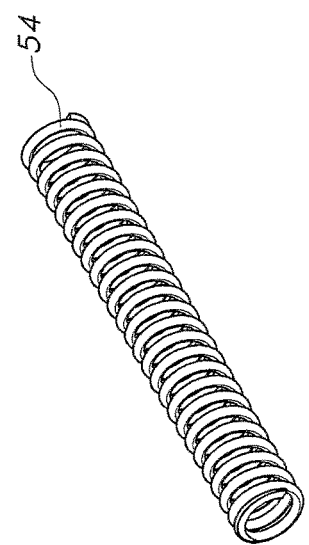
FIG. 19

US 10,021,886 B2

METHOD AND APPARATUS FOR DESHELLING SHELLFISH

BACKGROUND INFORMATION

Field of the Invention

The invention relates to a process for deshelling shellfish, particularly lobsters.

Discussion of Prior Art

The act of processing lobster meat is an inherently tedious process. The bulk of the editable meat that is found within a lobster is in the claws, knuckles, and tail, constituting a total of seven different pieces, each of which presents its own challenges for picking. Due to the inherent challenges, deshelling lobsters and picking the meat for food preparation has always been a process that requires a significant amount of manual labor, which increases the costs of production and the time that it takes to generate large quantities of prepared meat.

What is needed, therefore, is an automated process of removing lobster meat from the lobsters shell.

BRIEF SUMMARY OF THE INVENTION

The invention is an automated process for deshelling and removing meat from shellfish, and in particular, lobster, and the apparatus therefor. The process starts by sanitizing the lobster. The lobster is then butchered to sever the tail, the knuckles, and claws from the lobster body. The severed body parts are then cut along the shell, and the meat is then extracted and packaged. The apparatus includes a steam station, butchering station, cutting station, extraction station, batching station, and retort station.

The steam station uses high temperature short time pasteurization to sanitize the shells and meat, and also causes the meat to separate from the shell. A conveyor belt brings the sanitized lobster to the butchering station, which uses a vision system to capture the location and dimensions of the lobster on the belt. One or more vision-guided robots then pick up the lobster by the body and then uses a number of butchering blocks to sever the tail, claws, and knuckles. Those parts are then sent to the cutting station, where a specially designed gripping conveyor secures the parts while a water knife cuts the shell. Those cut shells are then conveyed through the extraction station, where another vision system captures the location and dimension of the cut part, and additional vision-guided robots extract the meat and discard the shells. The extracted meat is then sent on to the packaging station, where it is packaged, and then to a retort station, which prepares the package for transport and sale by cooking the meat in the sealed package and then chilling the package to preserve the final product.

BRIEF DESCRIPTION OF THE DRAWINGS

The present invention is described with reference to the accompanying drawings. In the drawings, like reference numbers indicate identical or functionally similar elements. The drawings are not drawn to scale.

FIG. 8 is a perspective view of the cutting chamber.

FIG. 9 is a side view of the cutting chamber.

FIG. 17 is a perspective view of a portion of the grip track.

FIG. 18 is a perspective view of the cam slide.

FIG. 19 is a perspective view of the nose spring.

FIG. 20 is a perspective view of the nose slide.

DETAILED DESCRIPTION OF THE INVENTION

The present invention will now be described more fully in detail with reference to the accompanying drawings, in which the preferred embodiments of the invention are shown. This invention should not, however, be construed as limited to the embodiments set forth herein; rather, they are provided so that this disclosure will be complete and will fully convey the scope of the invention to those skilled in the art.

Figure 1:
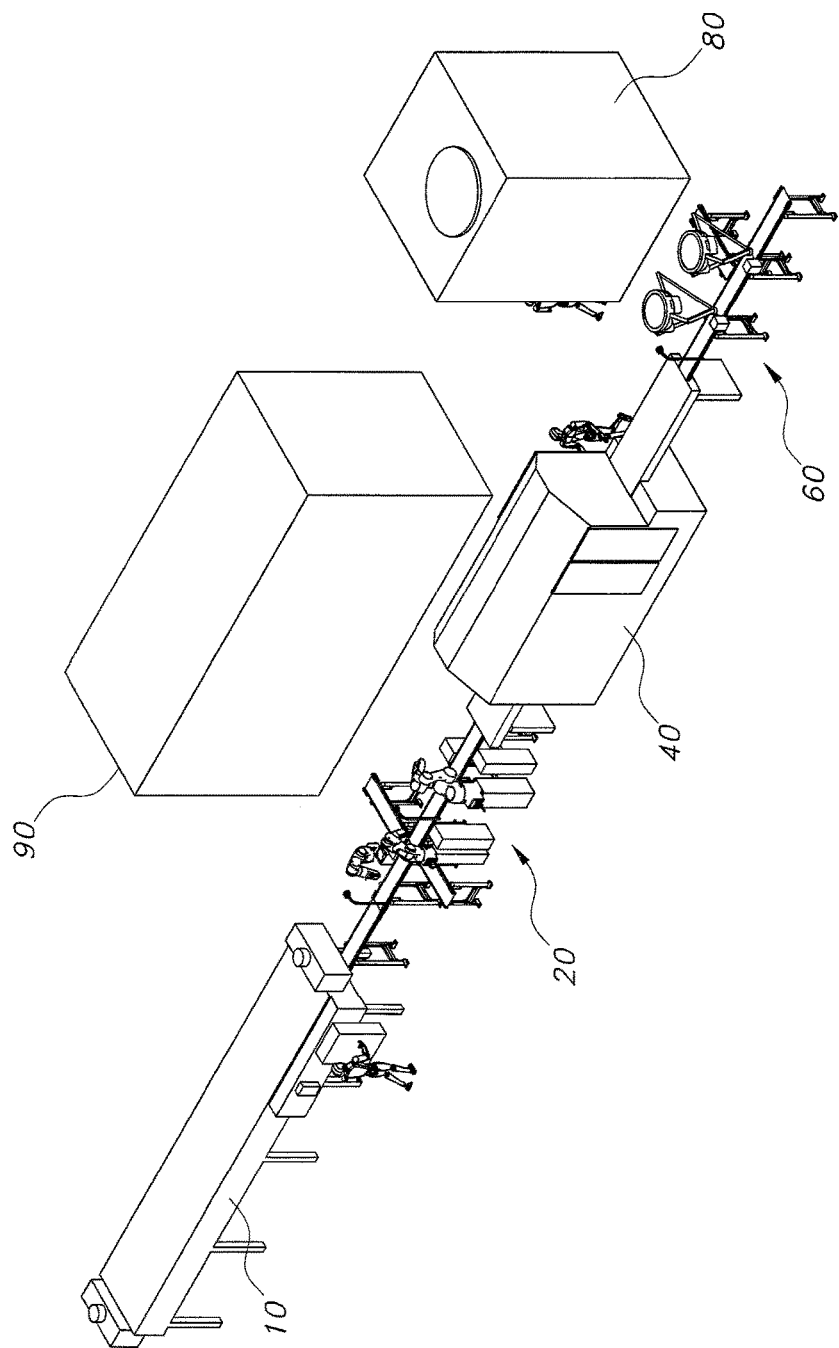
FIG. 1 is a perspective view of the lobster deshelling processing line according to the invention.
Figure 2:
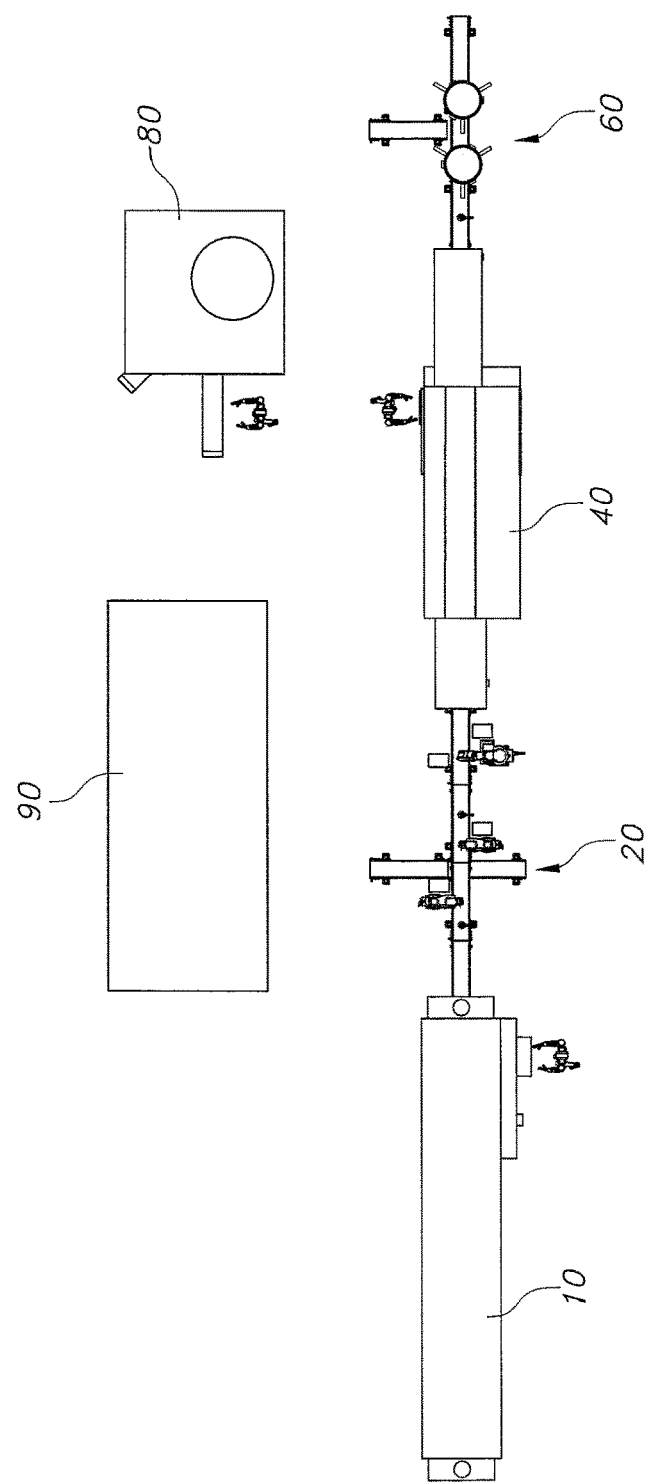
FIG. 2 is a plan view of the processing line.

FIGS. 1 and 2 illustrate an automated processing line 100 for deshelling shellfish, and in particular, for deshelling lobster. The processing line 100 comprises a steam station 10, a butchering station 20, a cutting station 40, an extraction station 60, a batching station 80, and a retort station 90. The general process is as follows: lobsters are sent through the steam station 10 where they are sanitized. Preferably, the lobsters are already dead. The lobsters then pass through the butchering station 20 where the tails, claws, and knuckles are separated from the lobster's body. The separated parts are then sent through a cutting station 40 where they are tightly gripped and where the shells are cut. The cut lobster parts exit the cutting station 40 and pass through the extraction station 60, where the shells are removed and the meat extracted. The meat is then sent to a batching station 80, where is it packaged, and then on to a retort station 90 where the packaged product is cooked, then chilled, and made ready for transport and sale.

The steam station 10, illustrated in FIGS. 1 and 2, is constructed in this embodiment as a tunnel in which high temperature short time pasteurization takes place, which is a well-known method of heat pasteurization. As the lobster passes through the steam station 10, the pasteurization process sterilizes the outside of the shell and the surface of the meat inside the shell, and causes the meat to detach from the shell. This process does not cook the meat and primarily serves to sanitize the lobster prior to the shell being cracked and the meat removed.

FIGS. 1-7 illustrate the butchering station 20, which includes a first conveyor belt 21, a first vision system 22, one or more butchering robots 24, and one or more breaking blocks 25. The sterilized lobster exits the steam station 10 and enters the butchering station 20 via the conveyor belt 21 and passes under the first vision system 22, which captures the lobster's dimensions. Many conventional vision systems may be suitable for this task, such as, for example, the IN-SIGHT vision system sold by Cognex Corporation. Once the vision system 22 has captured the location and dimensions of the lobster, the information is relayed to one or more of the butchering robots 24. The butchering robots 24 are vision-guided robotic systems, such as, for example, six-axis vision-guided robots. Each individual robot 24 is capable of butchering a single lobster, and multiple robots 24 may be used to process a larger quantity of lobster.

Using the information from the vision system 22, the butchering robot 24 grips the lobster at the center of its body. It then puts the lobster into a suitable one of the breaking blocks 25, which are secured to a work station 26, and twists the body to sever the body part. The embodiment of the processing line 100 that is adapted to deshell lobster, for example, includes three different breaking blocks, a tail breaking block 25A shown in FIG. 6, a knuckle breaking block 25B shown in FIG. 7, and a claw breaking block (not shown). Each breaking block 25 includes an insertion opening 32 and a grip wedge 34. The butchering robot 24 recognizes which body part, tail, knuckle, or claw, is to be cracked and moves the appropriate body part into the insertion opening 32 of the appropriate breaking block 25, wedges the part into grip wedge 34, and then rotates the body to sever the body part. The severed part is then placed back on the conveyor 21 and sent to the cutting station 40. An exit conveyor 28 may also be provided to provide for separate sorting of certain body parts, such as the tail, which may have value as an in-shell product. It is understood, that, depending on the particular type of shell fish that is to be shelled with the processing line 100 according to the invention, other types of breaking blocks may be used and that the scope of this invention is not limited to the types of breaking blocks shown in the figures.

FIGS. 8 and 9 illustrate the cutting station 40, which includes a second vision system 42, a plurality of water knives 44, and a second conveyor 46, referred to hereinafter as a gripping conveyor 46. The body part is moved onto the gripping conveyor 46 from the conveyor belt 21, where it is securely gripped and brought into the cutting station 40, which, in this embodiment, is constructed as a tunnel. As the body part approaches the entrance to the cutting station 40, the second vision system 42 creates an image of the body part, identifies the part, captures its precise dimensions and position on the gripping conveyor 46, and then calculates a desired cut pattern to remove the shell. For example, the shell on the claw is cut around the outer edge, whereas the shell on the knuckle is cut on both ends. Once the cut pattern is determined, the water knife 44 cuts the shell accordingly.

FIGS. 10-12 and 17-20 illustrate the gripping conveyor 46, which has been specially constructed for processing lobster meat. The gripping conveyor 46 includes a conveyor belt 47, cam tracks 48, and a plurality of grip bars 49 that extend across the width of the gripping conveyor 46. Affixed to the conveyor belt 47 are a plurality of grip tracks 51, which extend out from the belt 47 toward the cam tracks 48. The grip tracks 51 are formed as a shallow channel, having a bottom and two short sides that extend upward to form the channel and inner ends of the grip bars 49 are captured in the channels. The grip bar 49 is a spring loaded bar comprising a nose slide 52, a nose spring 54, and a cam slide 56, and that is coupled to a wheel 57 placed in the cam track 48. The nose slide 52 has a first end 53 that extends through the nose spring 54 and is coupled to the cam slide 56 and a second end 55 that is in contact with the severed lobster part. The first end 53 of the nose slide has a knob or protrusion that is slidably captured in a groove 56A on one end of the cam slide 56; the wheel 57 is attached to the other end of the cam slide 56. As the conveyor belt 47 moves, the grip tracks 51 move the grip bars 49 along the cam tracks 48.

The cam tracks 48 are wider at the entry and exit ends of the cutting station 40 to allow the severed lobster part to enter and exit the gripping conveyor 46 without interference from the grip bars 49. Inside the cutting station, the distance between the cam tracks 48 narrows which causes the grip bars 49 to slide toward the center of the conveyor belt 47 in the grip tracks 51 and to close in on the severed lobster part. The nose springs 54 cause the grip bars 49 to apply compression to the lobster part, holding it in place on the conveyor 47. The number and spacing of the grip bars is such, that multiple grip bars 49 are in contact with each severed lobster part.

Figure 13:
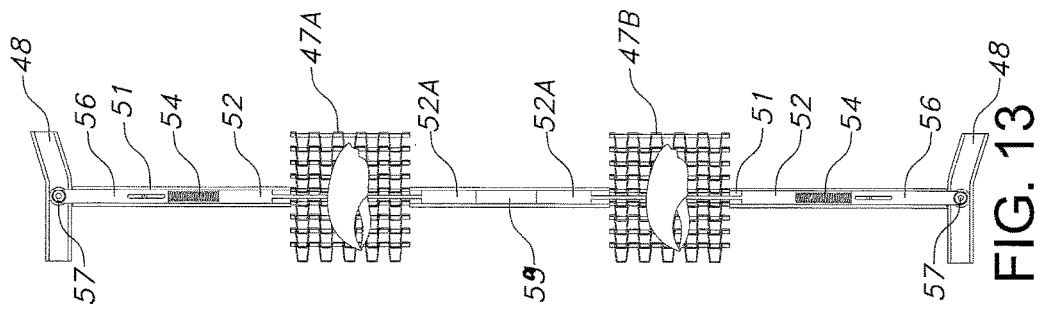
FIG. 13 is a top view of a double gripper.
Figure 12:
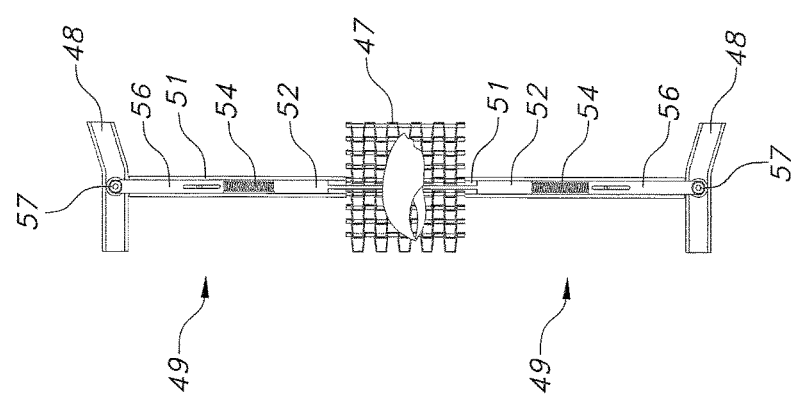
FIG. 12 is a top view of a single gripper.

FIG. 13 illustrates a second embodiment of the gripping conveyor 46 that includes two conveyor belts 47A, 47B, which are separated by a link 59. Nose slides 52A are affixed in the link 59 and support one side of the severed lobster part. Grip bars 49 as described in the first embodiment secure the severed part in place by applying pressure to the side of the body part opposite the nose slides 52A.

Figure 3:
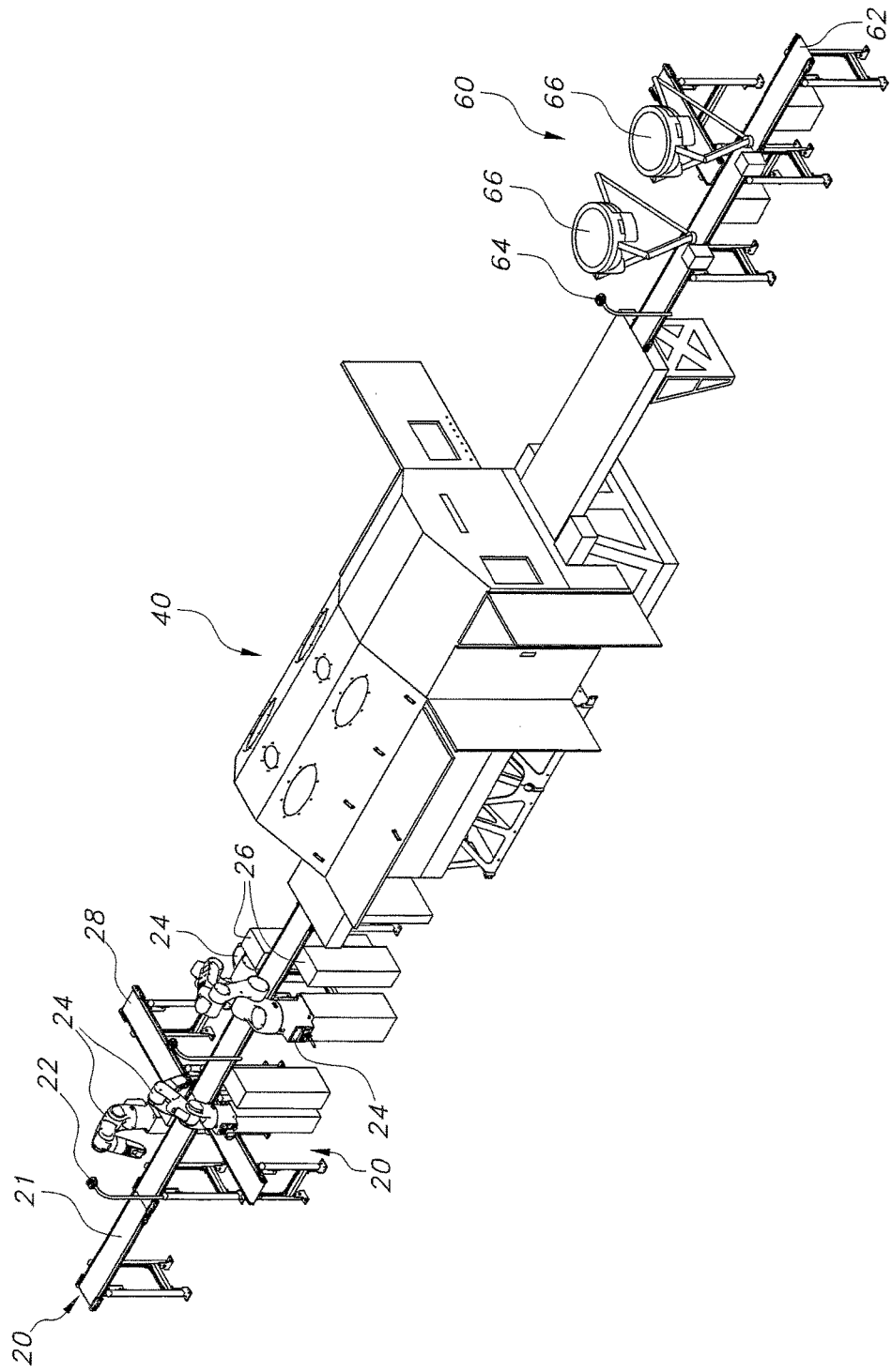
FIG. 3 is a perspective view of the processing line.
Figure 4:
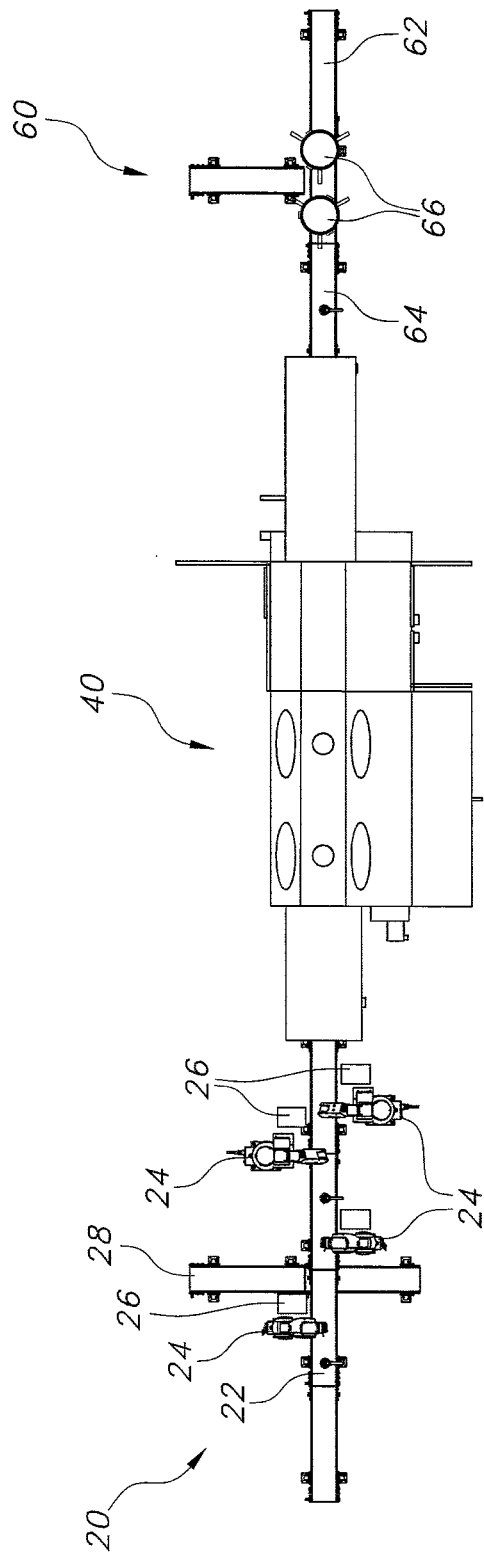
FIG. 4 is a top view of the equipment shown in FIG. 3.
Figure 5:
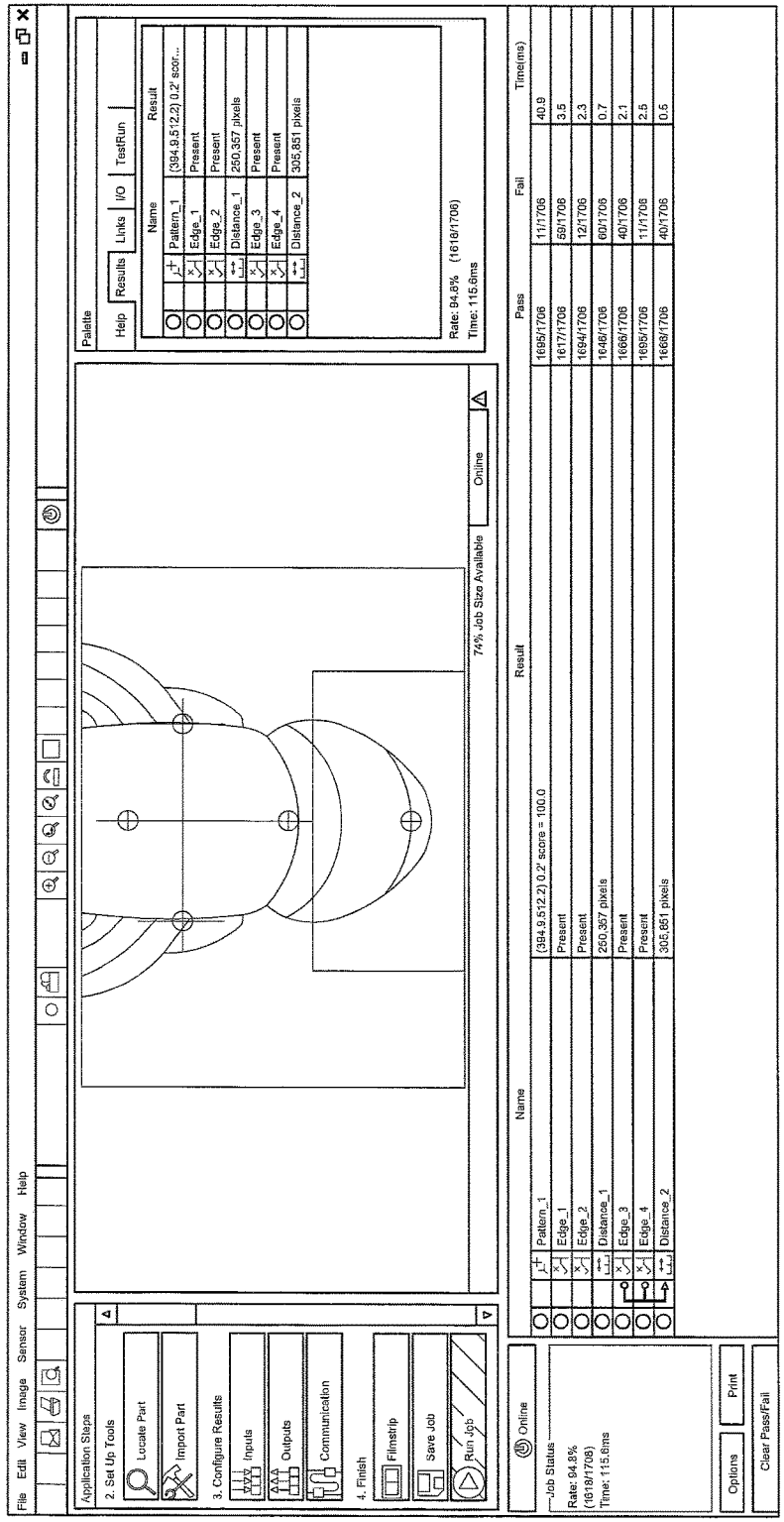
FIG. 5 is a view of the vision system capturing the dimensions of a lobster.
Figure 7:
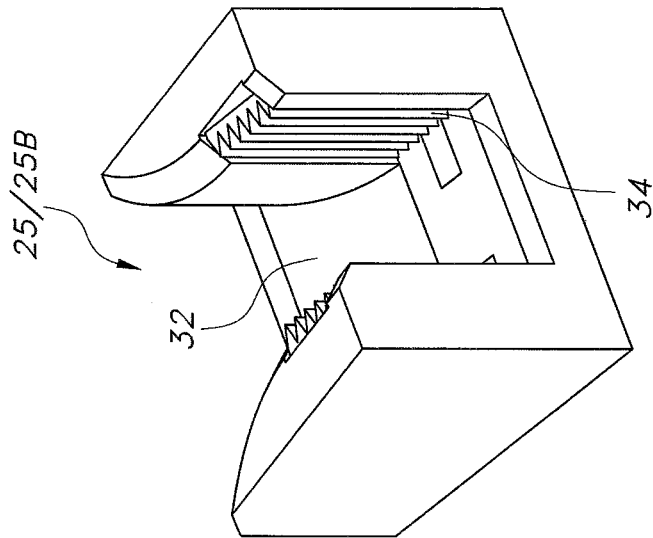
FIG. 7 is a perspective view of a breaking block.
Figure 6:
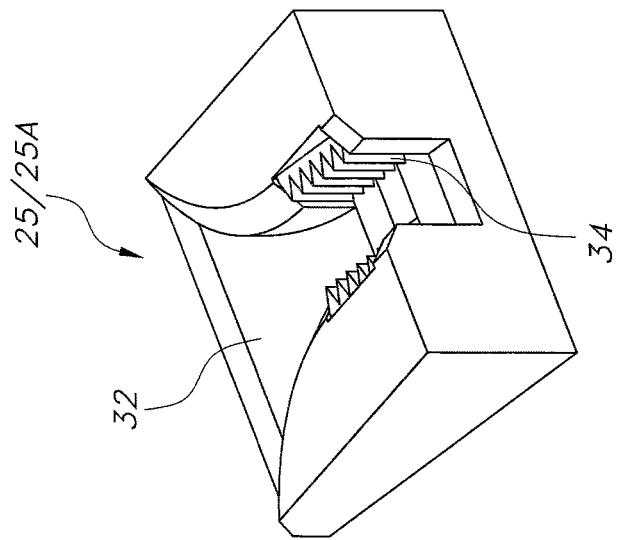
FIG. 6 is a perspective view of a breaking block.
Figure 10:
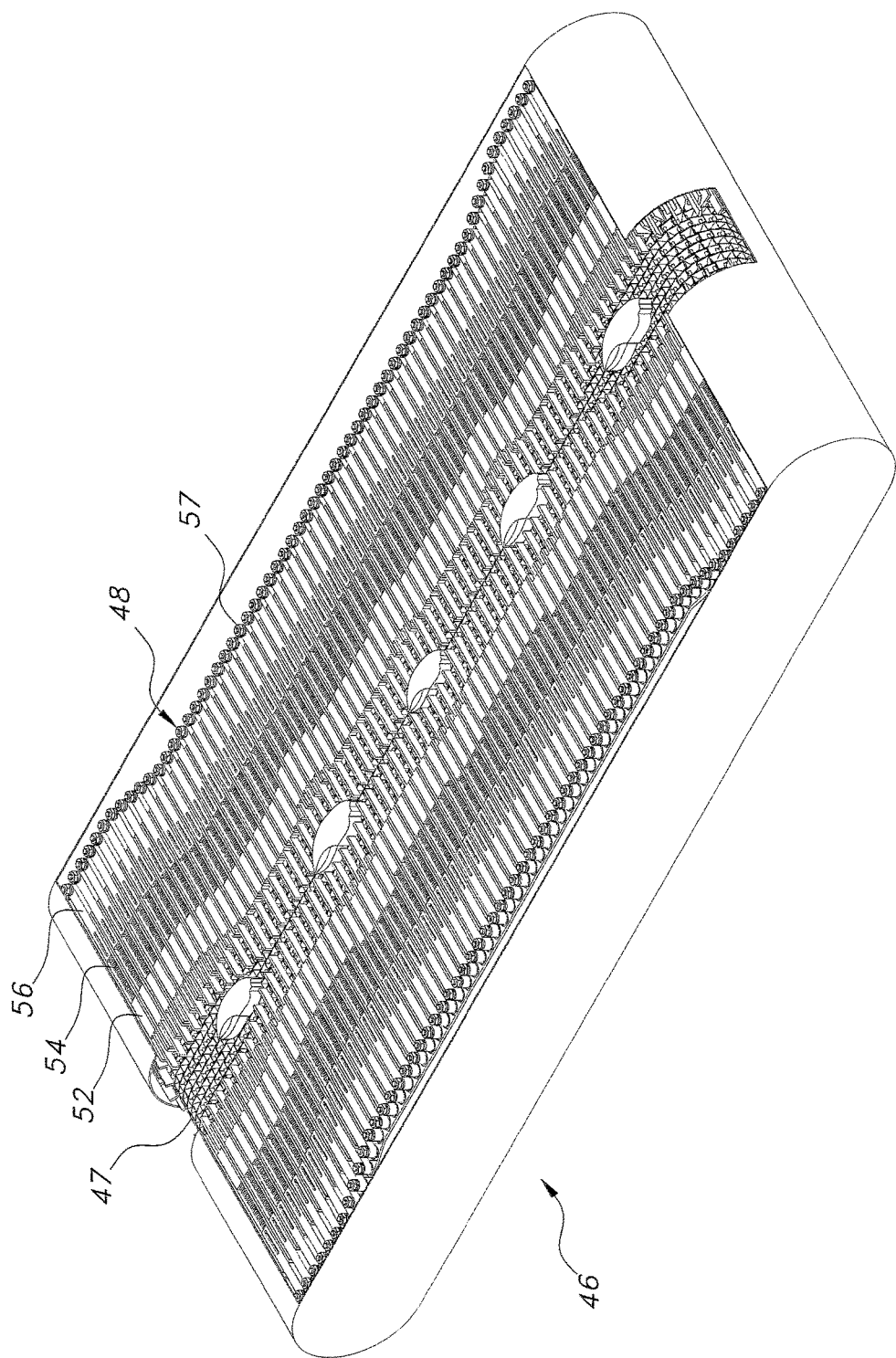
FIG. 10 is a perspective view of the gripper conveyor.
Figure 11:
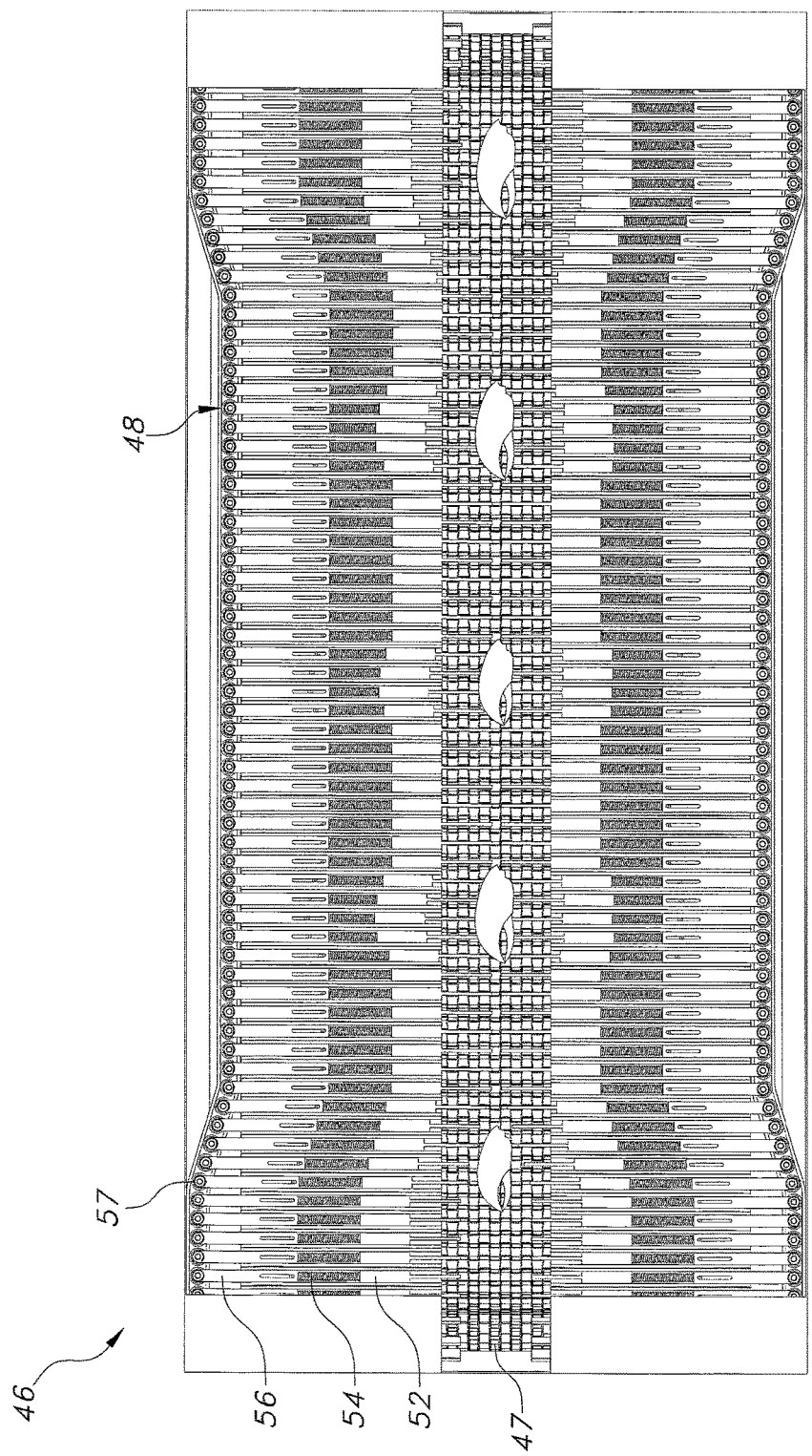
FIG. 11 is a top view of the gripper conveyor.
Figure 14:
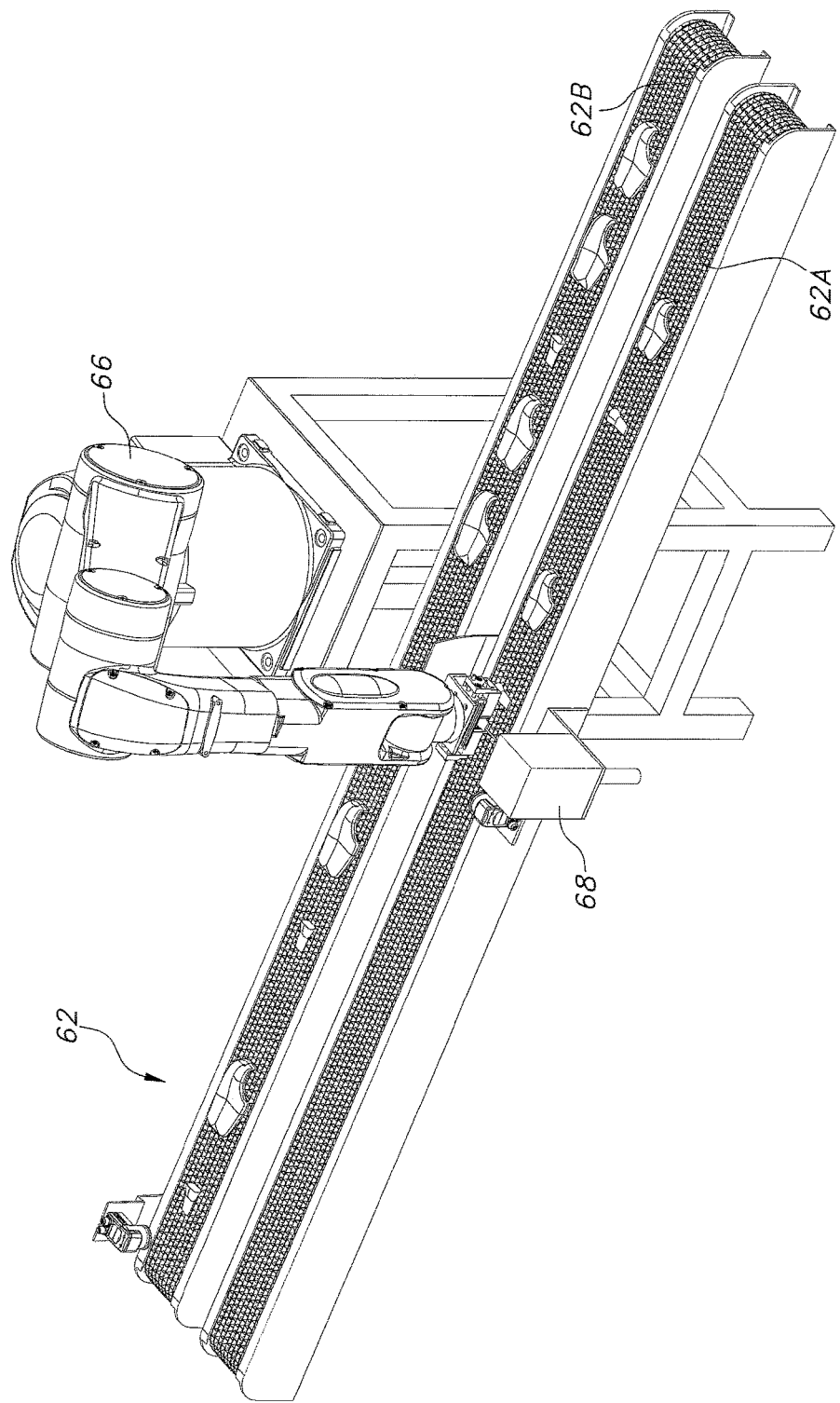
FIG. 14 is a perspective view of a meat extraction station.
Figure 15:
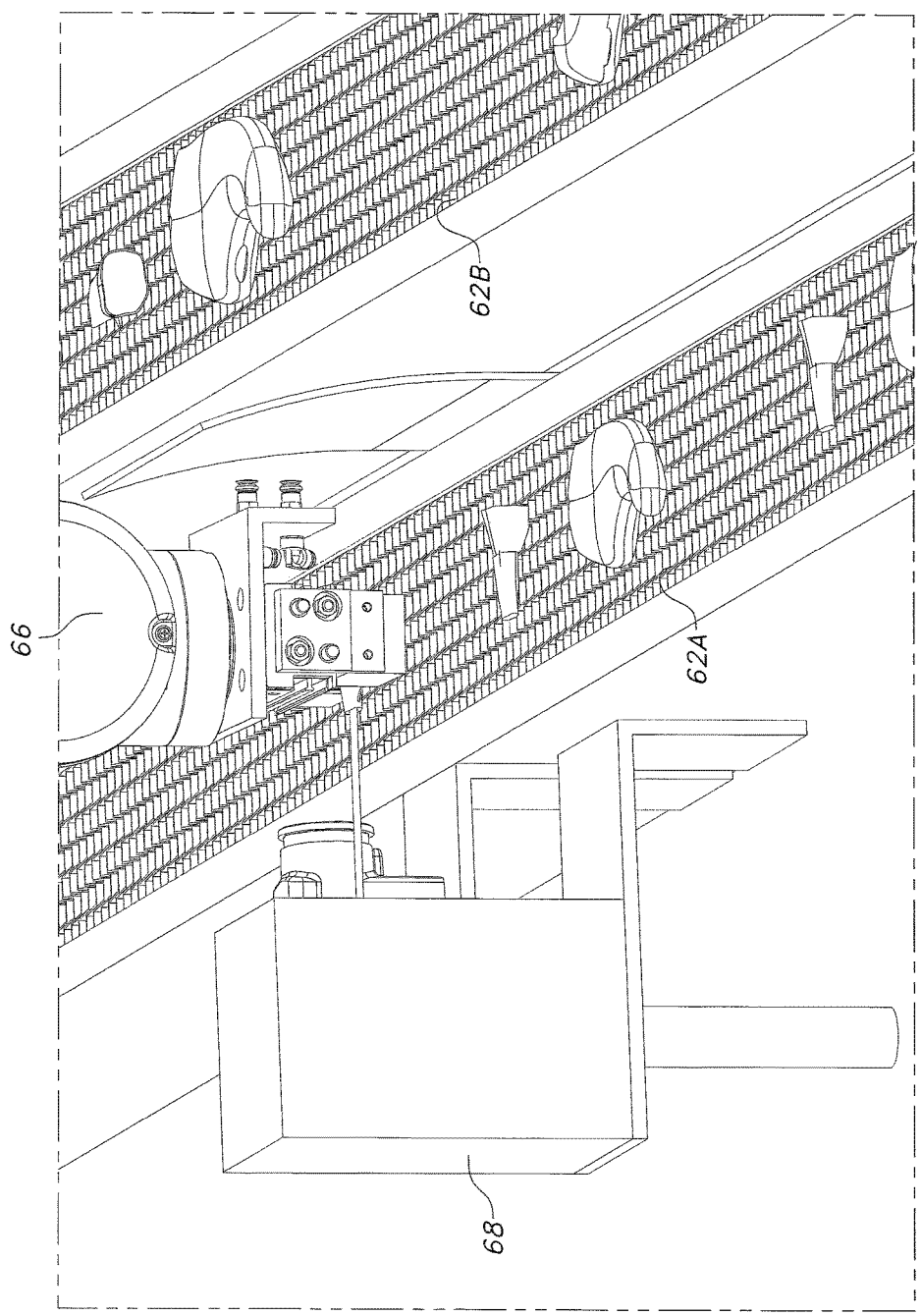
FIG. 15 is a perspective view of the meat extraction station, showing the head of the robot and the blower.
Figure 16:
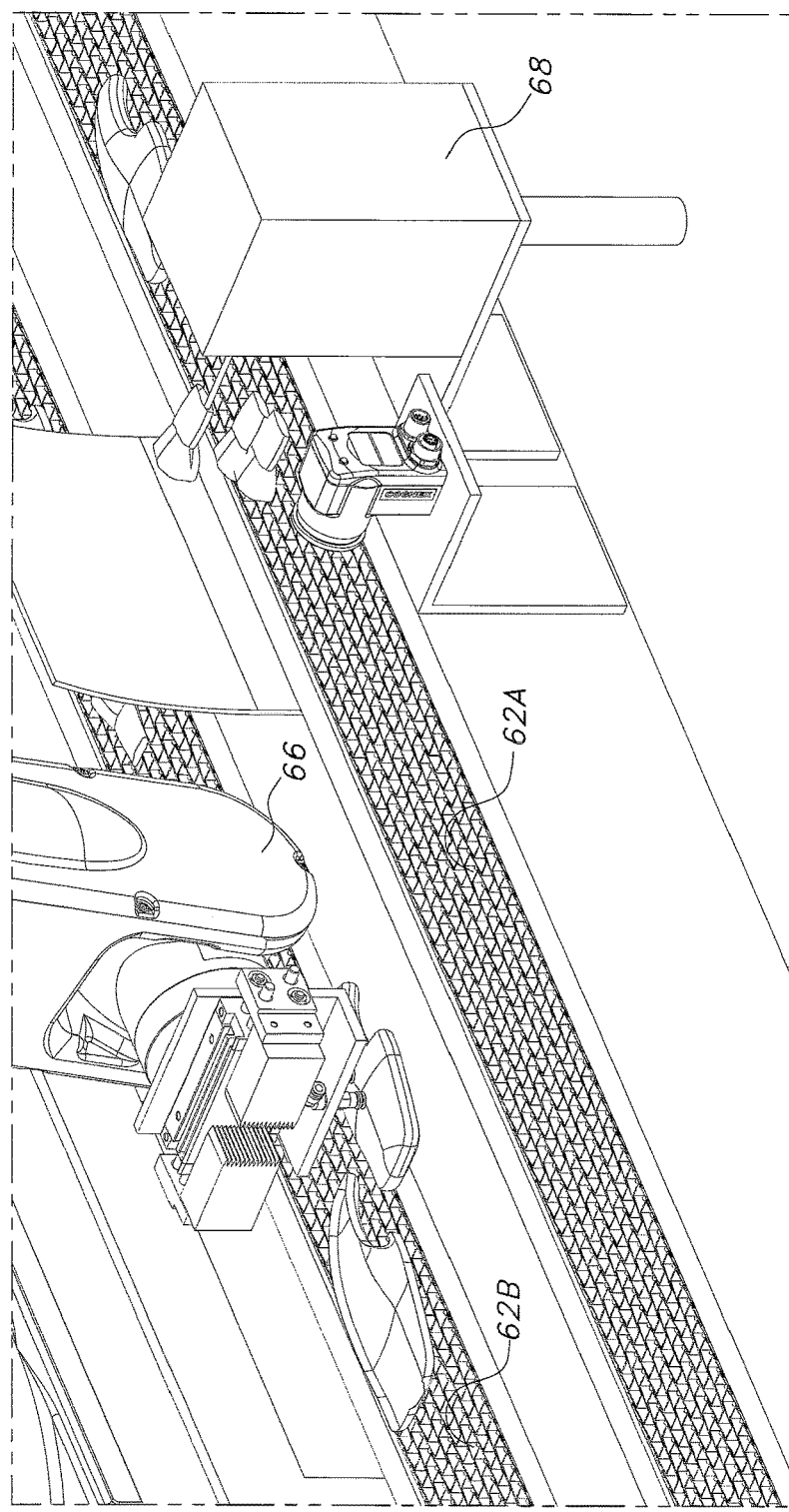
FIG. 16 is a perspective view of the meat extraction station showing the head of the robot and the blower.

FIGS. 14-16 illustrate the meat extraction station 60, which includes a third conveyor belt 62, a third vision system 64, shown in FIGS. 3 and 4, one or more extraction robots 66, and a blower 68. As the body part with its cut shell enters the meat extraction station 60, the third vision system 64 identifies the type of body part that is on the conveyor 62. The extraction robot 66 is a programmable vision guided robot, such as a six-axis or delta robot, and uses the information from the vision 64 to extract the meat. Different methods of extraction may be used, depending on the particular part. For example, the claw has been cut around its outer edge and the robot may simply remove the upper half and dump the meat onto the conveyor. The knuckle has been cut on each end, and the robot may pick up the knuckle and position it in front of the blower 68, which will use a burst of air or liquid, such as water, to force the meat out of the shell. The embodiment shown includes a first conveyor 62A and second conveyor 62B, where the meat-filled body part enters the station 60 on second conveyor 62B, and the delta extraction robot 66 places the shelled meat on the first conveyor 62A, and the empty shell is placed, or remains, on the second conveyor 62B.

Once the meat has been extracted from the shell, it continues along the conveyor 62 to the batching station 80, where the meat is packaged. The packages are sent on to the retort station 90 for final conditioning in preparation for sale. For example, the packages are first exposed to heat, to cook the meat, and then are chilled. Automated processes for packaging and preparing the package for sale are known and are not discussed in any detail herein.

It is understood that the embodiments described herein are merely illustrative of the present invention. Variations in the process may be contemplated by one skilled in the art without limiting the intended scope of the invention herein disclosed and as defined by the following claims.

What is claimed is:

1. A method for deshelling shellfish, the method comprising the following steps:
   a) providing a conveyor system that automatically transports the shellfish from one station to a next station;
   b) transporting the shellfish through a butchering station that has a vision-guided butchering robot and a butchering block, wherein the butchering robot grips the shellfish and places the shellfish into the butchering block to break the shellfish into one or more severed parts, and then places the one or more severed parts back on the conveyor system;

c) transporting the one or more severed parts through a cutting station that is equipped with a vision system that determines a shape of each of the severed parts and cutting a shell on each of the one or more severed parts to obtain one or more cut shell parts; and d) transporting the one or more cut shell parts through an extraction station and extracting meat from the one or more cut shell parts to obtain extracted meat.

2. The method of claim 1, further comprising a step of:

e) transporting the shellfish initially through a steam station and sanitizing the shellfish with steam.

3. The method of claim 1 further comprising the following step:

f) transporting the extracted meat through a batching station and gathering the extracted meat to a package of shellfish meat.

4. The method of claim 3 further comprising the following step:

g) transporting the package through a retort station to cook and then chill the shellfish meat.

5. The method of claim 1, wherein the shellfish is a lobster and the one or more severed parts include a severed lobster part in a shell, and the cutting station includes the steps of:

c1) using a water knife to cut two ends of the shell.

6. The method of claim 5, wherein the cutting station includes a second vision system and a gripping conveyor, and the cutting station includes the following steps:

c2) transporting the shellfish to the gripping conveyor where it is secured in a fixed position;

c3) transporting the shellfish under the second vision system that captures the dimensions of the shellfish for use with the water knife.

7. The method of claim 1, wherein the butchering station includes the step of:

b1) initially transporting the shellfish under a butchering station vision system that determines the size and position of the shellfish and relays that information to the vision-guided butchering robot.

8. The method of claim 7, wherein the shellfish is a lobster and wherein the butchering station includes three butchering blocks, one for a lobster tail, one for lobster knuckles and one for lobster claws and the butchering station includes the steps of:

b2) the butchering robot uses the information provided by the butchering station vision system to grip the lobster and places the lobster into each of the three butchering blocks severe the various lobster parts, placing each severed part back on the conveyor.

9. The method of claim 8, wherein the shellfish includes a plurality of shellfish and wherein the butchering stations includes a plurality of butchering robots, each robot having three butchering blocks, and the butchering station includes the following steps:

b3) transporting the plurality of shellfish through the butchering station wherein each shellfish is gripped by one of the plurality of butchering robots which places the shellfish into the three butchering blocks to sever the shellfish into one or more severed parts.

10. The method of claim 9, wherein the butchering station includes one or more exit conveyors and wherein the butchering station includes the following step:

b4: the butchering robots use the breaking blocks to sever the lobster into various parts and are programmed to place certain lobster parts on the conveyor to the cutting station and other parts on the exit conveyor.

11. The method of claim 1, wherein the extraction station includes a third vision system, at least one extraction robot, and a blower, and includes the following steps:

d1) transporting the shellfish parts under the third vision system which identifies the body part and conveys the information to the at least one extraction robot;

d2) transporting the shellfish parts to the extraction robot which grips the part;

d3) placing the severed lobster part in front of a blower; and d4) blowing air through the shell from one cut end toward the other cut end to force lobster meat out of the shell.

12. A processing line for processing a whole lobster, the processing line comprising:

a butchering station for obtaining one or more severed parts from the whole lobster, the butchering station including a vision-guided robot;

a cutting station for cutting a shell on the one or more severed parts;

an extraction station for removing lobster meat from the one or more severed parts; and one or more conveyors for transporting the lobster and the one or more severed parts to the various stations.

13. The processing line of claim 12, wherein the one or more conveyors includes a gripping conveyor for holding a severed part in position for cutting in the cutting station, the gripping conveyor having two sides with a cam track that extends along each side in a longitudinal direction of the gripping conveyor, and a conveyor belt that extends and travels along a center portion of the conveyor in the longitudinal direction, the conveyor belt having a plurality of grip tracks that extend outward from each side of the belt toward each of the two sides of the conveyor, and a plurality of grip bars, each grip bar coupled at one end to a cam wheel that is captured in one of the cam track and at captured at the other end in one of the grip tracks;

wherein, as the one or more severed parts move along the gripping conveyor, the distance between the cam tracks on the two sides of the conveyors lessens, causing the grip bars to extend inward along the grip tracks toward the conveyor belt and thereby exerting a lateral force on each severed part, so as to fix the one or more severed parts in position on the conveyor belt.

14. A gripping conveyor for securing a severed part of a lobster in preparation for cutting a shell of the lobster, the gripping conveyor comprising:

a conveyor belt that includes two sides and travels in a longitudinal direction and two cam tracks, one cam track positioned on either side of the conveyor belt;

a plurality of grip tracks that extend outward from each side of the conveyor belt toward the two cam tracks, the grip tracks formed as a channel;

a plurality of grip bars, each grip bar having a first end that is coupled to a cam wheel that is captured in a respective one of the cam tracks and a second end that is captured in the channel in the grip track, the grip bar also including a cam slide, nose spring, and nose slide on the second end;

wherein, as the conveyor belt travels along the conveyor, the grip bars are entrained in a grip track and a cam track and therefore also travel along with the conveyor belt;

wherein, the conveyor has a processing section that is bounded by an entry end and an exit end;

wherein the cam tracks are spaced a wider distance apart at the entry and exit end and a narrower distance apart at the processing section; and wherein, as the conveyor belt with the severed part moves into the processing section, the narrower distance forces the grip bars to extend farther into the grip tracks, forcing the nose slide on the respective grip bar up against the severed part, thereby securing the severed part in position for cutting.

15. The gripping conveyor of claim 14, wherein the conveyor belt includes two conveyor belts separated by a link.

\* \* \* \* \*